(12) United States Patent
Gouhier et al.

(10) Patent No.: US 9,227,514 B2
(45) Date of Patent: Jan. 5, 2016

(54) ADAPTATION OF A SIMULATED ENGINE-BRAKING INSTRUCTION

(71) Applicant: RENAULT s.a.s., Boulogne-Billancourt (FR)

(72) Inventors: Nicolas Gouhier, Igny (FR); Yann Chazal, Paris (FR); Jean-Marie Vespasien, Choisy-le-Roi (FR); Sebastien Foot, Guyancourt (FR); Walter Francesconi, Saint Etienne Sous Bailleul (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/356,496

(22) PCT Filed: Nov. 7, 2012

(86) PCT No.: PCT/EP2012/071957
§ 371 (c)(1),
(2) Date: Jun. 18, 2014

(87) PCT Pub. No.: WO2013/068361
PCT Pub. Date: May 16, 2013

(65) Prior Publication Data
US 2014/0336859 A1 Nov. 13, 2014

(30) Foreign Application Priority Data

Nov. 8, 2011 (FR) ...................................... 11 60158

(51) Int. Cl.
*B60L 9/00* (2006.01)
*B60L 7/18* (2006.01)
*B60L 15/20* (2006.01)

(52) U.S. Cl.
CPC ............... *B60L 7/18* (2013.01); *B60L 15/2009* (2013.01); *B60L 2240/423* (2013.01); *B60L 2260/44* (2013.01); *Y02T 10/642* (2013.01); *Y02T 10/7275* (2013.01)

(58) Field of Classification Search
CPC .......................................................... B60L 7/18
USPC ................................................. 701/22, 51, 53
See application file for complete search history.

(56) References Cited

U.S. PATENT DOCUMENTS

| 5,915,801 A | 6/1999 | Taga et al. |
| 6,709,075 B1 | 3/2004 | Crombez et al. |

(Continued)

FOREIGN PATENT DOCUMENTS

| EP | 0 754 588 | 1/1997 |
| WO | 2009 077835 | 6/2009 |

OTHER PUBLICATIONS

International Search Report Issued Dec. 12, 2012 in PCT/EP12/071957 Filed Nov. 7, 2012.

(Continued)

*Primary Examiner* — Thomas G Black
*Assistant Examiner* — Luke Huynh
(74) *Attorney, Agent, or Firm* — Oblon, McClelland, Maier & Neustadt, L.L.P.

(57) ABSTRACT

A method for adapting an engine-braking simulation for a vehicle provided with a regenerative braking device includes generating an arbitrated braking signal based on a simulated engine-braking signal developed on the basis of signals output from an acceleration pedal, and based on at least one signal output from at least one active safety system. The method also includes generating a braking instruction intended for the regenerative braking device by time filtration of the arbitrated braking signal.

13 Claims, 3 Drawing Sheets

(56) References Cited

U.S. PATENT DOCUMENTS

| | | | |
|---|---|---|---|
| 2005/0060076 A1* | 3/2005 | Phillips et al. | 701/51 |
| 2010/0292882 A1 | 11/2010 | Murata | |
| 2012/0038208 A1* | 2/2012 | Matsushita | 303/3 |

OTHER PUBLICATIONS

French Search Report Issued Aug. 1, 2012 in French Patent Application No. 1160158 Filed Nov. 8, 2011.

* cited by examiner

ADAPTATION OF A SIMULATED ENGINE-BRAKING INSTRUCTION

BACKGROUND

The present invention relates to the simulation of the engine braking, in particular on a vehicle powered by an electric motor, for example an electric vehicle and/or hybrid vehicle.

In a vehicle provided with at least one electric traction or propulsion motor, it is possible, in certain conditions, to use the electric motor as a generator and to thus obtain an electric braking means. Such a use is advantageous because, since it is regenerative, it makes it possible to recover some of the kinetic energy of the vehicle in order to recharge the batteries.

This electric braking may be engaged when the driver presses on the brake pedal and also when the driver lifts his foot from the acceleration pedal. In this last case, reference is made to deceleration without braking.

In particular, document FR2945243 describes a method for producing such an artificial engine brake when the acceleration pedal is not engaged. The torque applied is dependent in particular on the speed of the vehicle and the level of charge of the battery.

The majority of vehicles are provided with one or more active safety systems for avoiding undesirable behavior of the wheels. For example, a vehicle may comprise a wheel anti-lock system, such as ABS for example (anti-lock braking system from the German "AntiBlockerSystem"), and/or a wheel anti-skid system, such as an ESP (electronic stability program) system for example. These active safety systems communicate with one or more sensors able to provide information concerning the state of the wheels.

The active safety systems are set up so as to switch into a control state following certain detections by the sensor or the sensors.

For example, the active safety systems may be set up so as to transmit control signals in order to control hydraulic braking means, for example brake pads. For example, a wheel anti-lock system may transmit signals intended to loosen the brake pads so as to prevent the wheels from locking up. An anti-skid system may transmit signals intended to apply a hydraulic braking to one wheel or another so as to ensure the stability of the vehicle, in particular when turning.

The active safety systems may also be set up so as to transmit electronic signals intended for the engine. For example, a wheel anti-lock system may be set up so as to transmit torque requests to the engine so that the engine accelerates the rotation of the wheels. An anti-skid system may be set up so as to transmit requests to the engine intended to reduce the torque applied by the engine.

In conventional combustion vehicles, the level of engine braking is relatively low, such that this braking does not generally lead to a response of the active safety systems.

However, regenerative braking makes it possible to recover energy. Also, in the case of a vehicle provided with a regenerative braking means, it is beneficial to simulate the engine braking with a relatively increased braking level.

It has been proposed to integrate within the same vehicle an engine-braking simulation module able to develop simulated engine-braking instructions intended for the regenerative braking means, and one or more active safety systems, for example ABS and/or ESP.

It has been proposed to program the engine-braking simulation module such that it develops simulated engine-braking instruction values corresponding to relatively increased torque values in absolute terms. However, it is possible that these increased braking values could lead to a switching to a control state of one or more active safety systems.

The signals transmitted by the active safety system or the active safety systems could then prevail over the signals transmitted by the engine-braking simulation module. Since the engine-braking torque value is relatively increased, there is a risk, however, of relatively abrupt transitions during the switching from one state to the other of the active safety system or active safety systems. However, the directional stability of the vehicle is sensitive not only to the level of braking applied, but also to the variations of the braking applied. During returns to the normal state of the active safety system, the abrupt transitions of the applied torque thus risk leading to reactivations of the safety system to the control state.

There is thus a need for a method that would make it possible to avoid such oscillations, and more generally to combine energy recovery and safety.

BRIEF SUMMARY

A method for adapting the engine-braking simulation for a vehicle provided with a regenerative braking means, for example an electric braking means, is proposed. This method comprises:

generating an arbitrated braking signal based on a simulated engine-braking signal developed on the basis of signals output from an acceleration pedal, and based on at least one signal output from at least one active safety system, and generating a braking instruction intended for the regenerative braking means by time filtration of the arbitrated braking signal.

Thus, this filtration may make it possible to mitigate the excessively abrupt variations of the arbitrated signal and therefore to ensure an improved directional stability. In particular, this may make it possible to avoid the successions of activations/deactivations of one or more active safety systems.

The arbitration may consist in particular of selecting as the arbitrated signal value the value of the simulated signal whilst the active safety system or active safety systems is/are in its/their normal state.

Advantageously and in a non-limiting manner, the filtration may be activated when an active safety system switches from a control state to a normal state. In other words, the method may comprise:

detecting, for at least one active safety system, the switching from a control state to a normal state, activating the filtration following this detection.

In fact, an interruption of regulation, for example regulation provided by an ABS, ESP or MSR (engine drag-torque control, from the German "Motor Schlepp Regelung") system, may be likely to be accompanied by an abrupt transition from the arbitrated signal to the value of the simulated engine-braking signal output from a simulation module.

This method may thus make it possible to combine an increased level of simulated engine braking, vehicle safety, and user comfort.

The time filtration may consist for example in applying to the arbitrated signal a first-order linear filter in the form of $$e^{-\frac{t}{\tau}};$$

a Bessel filter, or the like.

Linear or non-linear filtration could be provided.

The time constant may advantageously be selected wisely so as to avoid the triggering of a new regulation by the safety system, whilst ensuring a certain comfort and a certain repeatability for the driver.

The method may comprise a step of selecting filtration to apply to an arbitrated signal based on at least one signal output from the at least one safety system. For example, it may be selected to activate the filtration during interruptions of regulation provided by one or more safety systems.

Advantageously and in a non-limiting manner, the simulation module may be set up so as to calculate a simulated engine-braking torque based on a state of the acceleration pedal, such that this simulated torque has a value greater than the equivalent braking torque that would be obtained with a combustion engine.

Advantageously and in a non-limiting manner, the filtration may be performed in:

a first phase with a first time constant until the braking instruction reaches a first value, a second phase performed with a second time constant greater than the first time constant.

Thus, the method may comprise:

performing a first filtration, corresponding to a first time constant, then performing a second filtration corresponding to a second time constant having a value greater than that of the first time constant.

Advantageously, the method may comprise:

detecting whether the braking instruction reaches a first value, following this detection, enforcing the switching from the first to the second filtration.

This first value may advantageously be lower in terms of absolute value than the torque value developed by the simulation module. In particular, this first value may be selected so as to be equal or substantially equal to a torque value equivalent to the engine braking that would be obtained with a combustion vehicle.

Thus, by performing the filtration in two phases, it may be possible to combine the non-triggering of an active safety system and comfort for the user. In fact, if the filtration of the torque instruction following an intervention of an ABS/ESP control unit is performed with an excessively increased time constant, the driver may have the impression that the vehicle is no longer braking. This solution thus makes it possible to return quickly to a regenerative braking instruction at a braking level such that there is no risk of triggering an active safety system, and in particular a locking-up of the wheels, before progressively reaching the final regenerative braking level.

Advantageously and in a non-limiting manner, it is possible to deactivate the filtration when the braking instruction value is sufficiently close to the value of the simulated engine-braking signal developed by the simulation module.

Advantageously and in a non-limiting manner, it is also possible to deactivate the filtration when one or more active safety systems switch into the control state.

Advantageously and in a non-limiting manner, it is possible to deactivate the filtration in the case that a signal output from the acceleration pedal corresponding to a pressing on the pedal is received, in particular when the torque instruction output from the accelerator pedal exceeds the filtered torque instruction.

The method described above may be implemented by means of software, by programming certain components of the processor type. This method is therefore carried out relatively easily and at low cost.

The invention also proposes a computer program comprising the instructions for executing the above-described method. This program may be implemented in a processor installed in a motor vehicle, for example a microcontroller, a DSP (digital signal processor), or the like.

The invention also proposes a device for adapting the engine-braking simulation, intended for a vehicle provided with a regenerative braking means. This device comprises:

receiving means, for example input ports, cables, wireless receiving means, or the like, for receiving a simulated engine-braking signal value output from a simulation module and developed on the basis of signals output from an acceleration pedal, and for receiving at least one signal output from at least one active safety system, an arbitration module set up to generate an arbitrated braking signal on the basis of the values received by the processing means, and processing means for generating a braking instruction intended for the regenerative braking means by time filtration of the arbitrated braking signal.

The arbitration module and/or the processing means may be integrated in, or may comprise, one or more processors.

Advantageously and in a non-limiting manner, the device may be set up so as to choose whether or not to apply the filtration to the arbitrated signal based on at least one of the signals output from the active safety system.

This device may or may not integrate the engine-braking simulation module and/or one or more active safety modules of the ABS type or the like.

This device may thus be set up so as to carry out the method described above. In particular, this device may be set up so as to develop an engine-braking command intended for the regenerative braking means by filtration of the arbitrated signal.

The invention also proposes a braking system comprising the adaptation device described above and a distribution device. This distribution device (torque blending device) is set up so as to calculate, on the basis of a braking command output from the brake pedal, a regenerative braking command intended for the regenerative braking means and a hydraulic braking command intended for the hydraulic braking means.

The braking system and/or the adaptation device may be integrated or may comprise one or more digital processing means of the processor type; for example, a microcontroller, a DSP, a microprocessor, an FPGA (field programmable gate array) or the like.

The invention also proposes a vehicle, for example a motor vehicle, provided with a regenerative braking means and comprising an adaptation device and/or a braking system as described above. This vehicle may be, for example, an electric vehicle or hybrid vehicle.

BRIEF DESCRIPTION OF THE DRAWINGS

Further features describing the invention in greater detail will become clearer from the following description given by way of example and with reference to the figures, in which.

DETAILED DESCRIPTION

Figure 1:
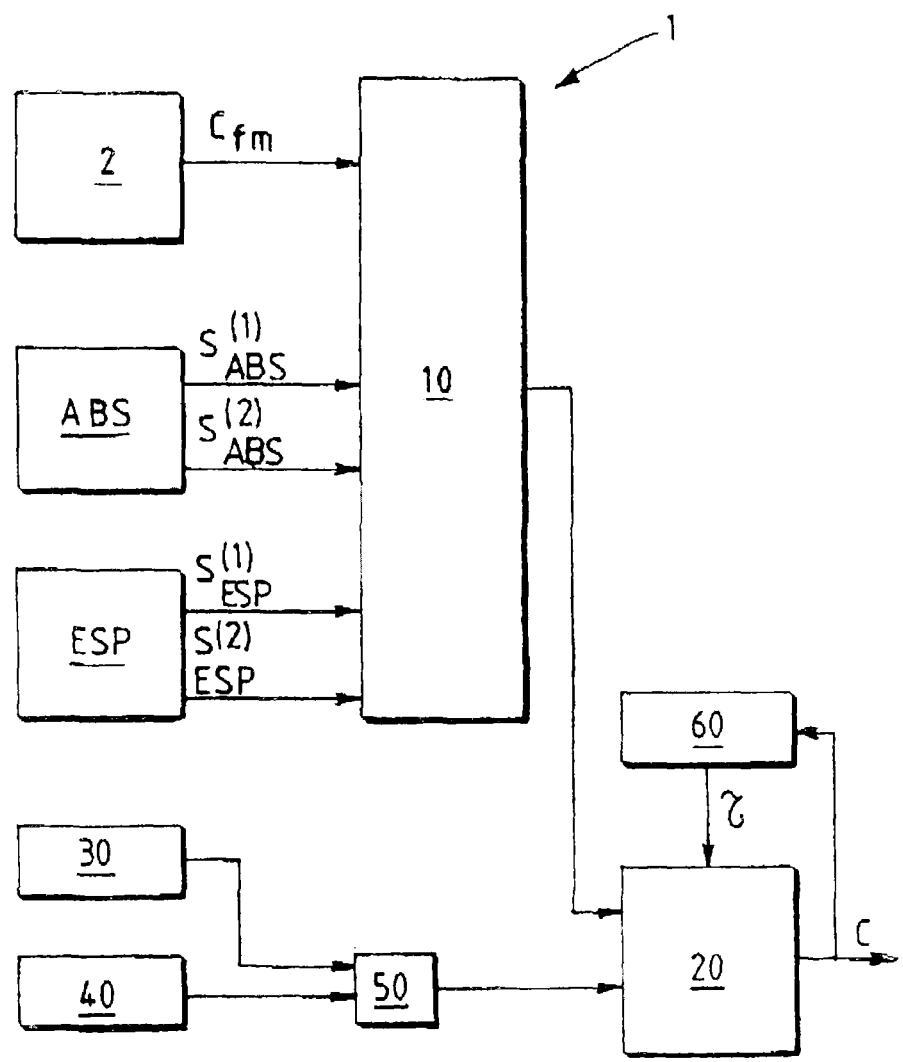
FIG. 1 shows schematically an example of a simulation device in accordance with an embodiment of the invention.

With reference to FIG. 1, the device 1 comprises an arbitration module 10 receiving a simulated engine-braking signal $Cf_m$ output from a braking simulation module 2.

This braking simulation module 2 for example may implement the method described in patent document FR2945243, and will not be described in further detail.

The module 10 also receives signals $S_{ABS}^{(1)}$, $S_{ABS}^{(2)}$, $S_{ESP}^{(1)}$, $S_{ESP}^{(2)}$ output from a number of active safety systems ABS, ESP.

For example, the module 10 receives signals $S_{ABS}^{(1)}$, $S_{ABS}^{(2)}$ output from a module ABS and signals $S_{ESP}^{(1)}$, $S_{ESP}^{(2)}$ output from a module ESP. For each of the modules ABS, ESP, the received signals comprise a hydraulic braking control signal $S_{ABS}^{(1)}$, $S_{ESP}^{(1)}$ intended for the control of the brake pads and a torque control signal $S_{ABS}^{(2)}$, $S_{ESP}^{(2)}$ intended for the engine.

The active safety systems ABS, ESP are likely to switch from a normal state to a control state when signals output from sensors (not shown) make it possible to detect a risk, for example a risk of the locking-up of the wheels or of the skidding of the wheels.

The module 10 is set up so as to perform an arbitration between the engine-braking signal $Cf_m$ output from the simulation module 2 and the signals $S_{ABS}^{(1)}$, $S_{ABS}^{(2)}$, $S_{ESP}^{(1)}$, $S_{ESP}^{(2)}$ output from the active safety systems ABS, ESP.

More precisely, when the system ABS transmits a signal $S_{ABS}^{(1)}$ in the direction of the brake pads so as to loosen the brakes, the module 10 develops an arbitrated signal selected so as to be equal to 0. There is thus no simulation of the engine braking when the system ABS tends to wish to loosen the brake pads.

The same is true when the system ESP transmits a signal in the direction of the brake pads so as to exert a braking.

When the system ABS or the system ESP transmits a signal $S_{ABS}^{(2)}$, $S_{ESP}^{(2)}$ in the direction of the engine so as to increase or decrease the torque respectively, the module 10 selects as the arbitrated signal Carb, the signal output from the corresponding safety systems ABS or ESP.

In other words, the signals output from the active safety systems prevail over the simulated engine-braking signal output from the accelerator pedal $Cf_m$.

This arbitration module 10 thus makes it possible in a relatively simple manner to take into consideration the signals output from the safety systems during the application of the simulated engine braking.

However, the arbitrated signal Carb is likely to vary severely.

These variations indeed are not detrimental when they follow a switching to the control state of the active safety systems. In fact, the safety systems ABS and ESP transmit the most suitable signals with respect to the actual situation of the vehicle, as reflected by the sensors.

By contrast, when the systems ABS or ESP switch from the control state to the normal state, the arbitrated signal Carb switches from a value controlled by the active safety system, for example a value of zero or a value output directly from the system ABS or ESP, to the torque instruction value output from the accelerator pedal $Cf_m$.

The device 1 comprises a filtration module 20 for applying a filtration to the arbitrated signal Carb during such transitions associated with an interruption of an active safety system. This module 20 is set up to apply a first-order linear filtration in the form of $$\frac{t}{e^\tau}.$$

The device 1 comprises modules 30, 40, 50 for activating and deactivating the specific filtration module 20.

The module 30 is set up to calculate specific filtration activation conditions. This module 30 is thus set up so as to detect the interruptions of each of the active safety systems ABS, ESP. This module 30 for example may receive a signal for each active safety system, referred to as a flag signal, indicating a state of this safety system. This signal for example may have Boolean values, each value corresponding to a state of the active safety system.

The system 30 may be set up so as to transmit a signal for activation of the filtration module 20 in the case of falling edges of one of the flag signals.

The module 40 is set up to calculate specific filtration deactivation conditions.

This module 40 for example may compare the final torque instruction value C output from the filtration module 20 with the signal $Cf_m$ output from the accelerator pedal. If the difference between these two instruction signals proves to be lower than a threshold, the module 40 may then transmit a filtration deactivation signal.

The module 40 may also make it possible to implement other tests.

For example, when one of the active safety systems switches into the control state, that is to say, for example, over a rising edge of one of the flag signals, it is possible to deactivate the current filtration, since the arbitration module 10 allows signals output from this active safety system to prevail with respect to the torque instruction $Cf_m$ when this is necessary.

The module 40 may also be set up so as to deactivate the filtration in the case in which the driver presses on the acceleration pedal, in particular if the torque instruction output from the acceleration pedal exceeds the torque instruction at the output of the filtration module 20.

The module 50 makes it possible to develop, on the basis of the activation signals output from the module 30 and the deactivation signals output from the module 40, an activation order controlling the filtration module 20.

In an advantageous embodiment, a module 60 makes it possible to adjust the time constant of the filter. This module 60 for example may be programmed so as to enforce a first time constant at the start of filtration, followed by a rising edge of the activation order output from the module 50 for example, and to compare the torque instruction C with a first value.

This first value may have been estimated by simulation of a combustion engine-braking torque. This first value is thus estimated so as to correspond to the equivalent engine braking of a combustion vehicle.

Thus, the module 20 makes is possible to perform a first filtration with a relatively short time constant until the torque instruction C reaches substantially this first value. Then, when the torque instruction C is sufficiently close to this first simulated value, for example when the difference between the instruction value C and the first value is lower than a threshold, the module 60 enforces a second filtration time constant 20. The filtration is then much slower.

Figure 2:
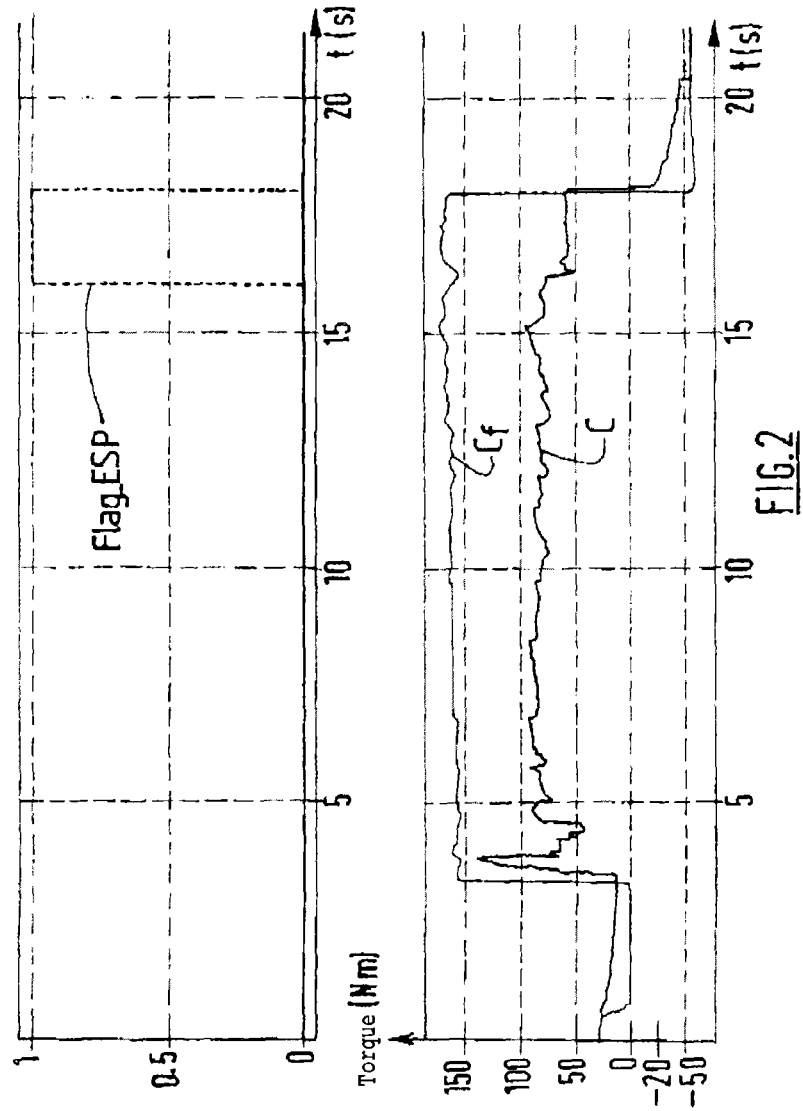
FIG. 2 shows two graphs illustrating exemplary variations over time of a flag signal of an active safety system, an estimated torque signal and a corresponding braking instruction.

With reference to FIG. 2, the graph below shows the course over time:
- of an estimated torque signal Cf output in particular from a simulation module and expressed here in Newton meters. If the acceleration pedal is pressed, this estimated torque has a positive value because the engine is expected to turn the wheels. By contrast, if the foot is lifted, this torque has a negative value, equal to a simulated engine-braking value, because it is then expected that the engine recovers energy by braking the wheels.
- of the braking instruction C applied effectively by means of regenerative braking and obtained in particular by filtration and expressed here in Newton meters.

The graph above shows the course over time of a flag signal Flag_ESP representative of the state of a system ESP.

In this example, the moment t=18 seconds corresponds approximately to a lifting of the driver's foot from the acceleration pedal.

The system ESP, then in a control state, returns to its normal state once this foot has been lifted. This is illustrated by the falling edge of the signal Flag_ESP.

This lifting of the foot also leads to a significant variation of the estimated torque signal $C_f$.

Following the falling edge of the signal Flag_ESP, the braking adaptation device enforces a filtration of the arbitrated signal Carb, equal to the simulated engine-braking signal $Cf_m$. This filtration is performed in two phases:

- a first filtration phase, which is relatively short and during which the signal C quickly reaches a first value, here substantially equal to −20 N m.
- a second filtration phase, corresponding to a time constant greater than that of the first filtration phase.

This second phase lasts here approximately up to t=20.5 seconds. The module 40 in FIG. 2 is in fact set up so as to transmit a filtration deactivation signal when the signal C is sufficiently close to the simulated engine-braking signal $Cf_m$. More precisely, the filtered signal C is regularly compared with the simulated engine-braking signal $Cf_m$; if the difference between these signals is lower than a threshold, a filtration deactivation signal is transmitted. The signal C then becomes equal to the simulated engine-braking signal $Cf_m$.

Figure 3:
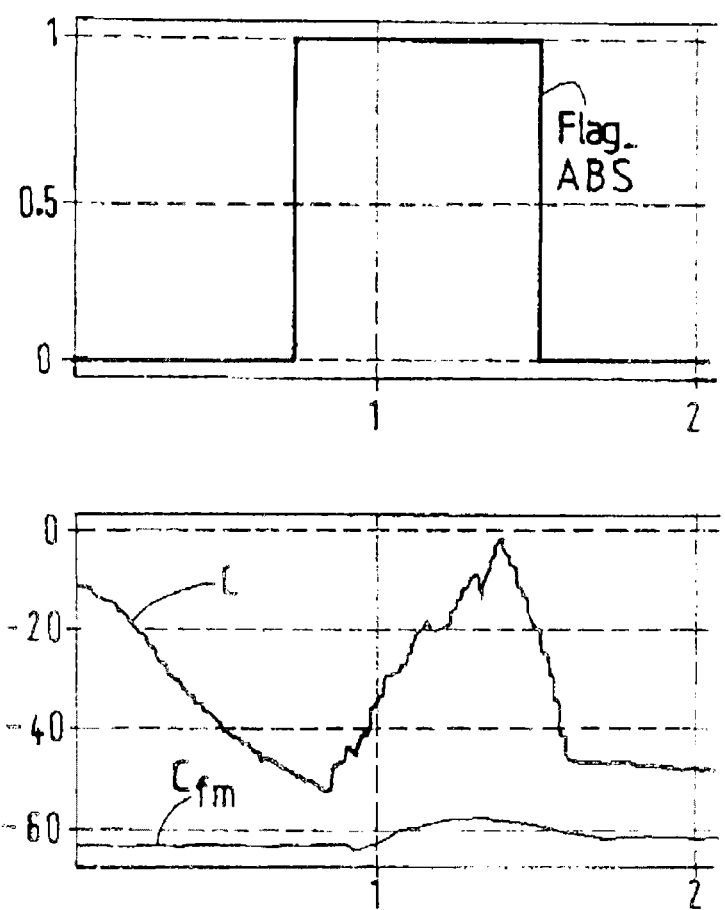
FIG. 3 shows two graphs illustrating exemplary variations over time of a flag signal of an active safety system, a simulated engine-braking signal and a corresponding braking instruction.

With reference to FIG. 3, the graphs shown correspond to a situation in which a driver's foot is lifted permanently.

The curve Flag_ABS is a flag signal indicating that the system ABS sends electronic signals intended for the engine so that the engine accelerates the rotation of the wheels or at least limits the recovery of energy.

The curve $Cf_m$ corresponds to the simulated engine-braking signal based on the state of the acceleration pedal and on the speed of the vehicle. Here, the driver's foot is raised and this simulated signal therefore has relatively low values.

The curve C corresponds to the braking instruction C applied effectively to the regenerative braking means.

The signals $Cf_m$ and C are expressed here in Newton meters.

The simulation module is set up so as to deliver a simulated signal with relatively increased values in absolute terms. In other words, the simulated engine braking is stronger than the engine braking that would be obtained with a combustion vehicle. This makes is possible to recover more energy, thus promoting the autonomy of the vehicle.

However, this application of a relatively strong braking is more likely to lead to a locking-up of the wheels. The system ABS is likely to be placed in a control state, as represented by the rising edge of the signal Flag_ABS at approximately t=0.7 seconds.

The arbitration module then selects to control the engine with the electronic signals transmitted by the system ABS in the direction of the engine rather than with the simulated braking signal. These electronic signals of the system ABS make it possible to limit the effective braking.

When the system ABS estimates that the risk of locking-up of the wheels is sufficiently low, it returns to the normal state. This is illustrated by the falling edge of the flag signal Flag_ABS.

The arbitration module then generates an arbitrated signal equal to the simulated signal $Cf_m$.

The adaptation device then performs a filtration of the arbitrated signal:

firstly a filtration with a relatively short time constant until the filtered signal C reaches a value of approximately −47 N m, then a filtration with an increased time constant. This second filtration phase may last longer than the first filtration phase and is not terminated here at t=2 seconds.

The invention claimed is:

1. A method for adapting an engine-braking simulation for a vehicle provided with a regenerative braking means, comprising:
    generating an arbitrated braking signal based on a simulated engine-braking signal developed on the basis of signals output from an acceleration pedal, and based on at least one signal output from at least one active safety system;
    generating a braking instruction intended for the regenerative braking means by time filtration of the arbitrated braking signal, the time filtration including:
        performing a first filtration, corresponding to a first time constant, of the arbitrated braking signal; and
        after the performing the first filtration, performing a second filtration, corresponding to a second time constant having a value greater than that of the first time constant, of the arbitrated braking signal; and
    applying the regenerative braking means to brake the vehicle according to the braking instruction generated by the time filtration of the arbitrated braking signal.

2. The method as claimed in claim 1, wherein, during the time filtration, the value of the simulated signal while each active safety system is in a normal state is selected as the value of the arbitrated braking signal.

3. The method as claimed in claim 1, further comprising:
    detecting, for at least one active safety system, switching from a control state to a normal state; and
    activating the time filtration following said detecting.

4. The method as claimed in claim 1, further comprising:
    detecting whether the braking instruction reaches a first value; and
    following the detecting, enforcing switching from the first to the second filtration.

5. The method as claimed in claim 4, wherein the first value is equal or substantially equal to a torque value equivalent to the engine braking that would be obtained with a combustion vehicle.

6. A non-transitory computer readable medium storing a program that, when executed by a computer, causes the computer to execute the method as claimed in claim 1.

7. A device for adapting an engine-braking simulation for a vehicle provided with a regenerative braking device, said device comprising:
    receiving means for receiving a simulated engine-braking signal output from a simulation module and developed on the basis of signal output from an acceleration pedal, and for receiving at least one signal output from at least one active safety system;
    an arbitration module set up to generate an arbitrated braking signal on the basis of the simulated engine-braking signal and the signal from the active safety system received by the receiving means; and
    processing means for generating a braking instruction intended for the regenerative braking device by time filtration of the arbitrated braking signal, the time filtration by the processing means including:
        a first filtration, corresponding to a first time constant, of the arbitrated braking signal; and
        after the first filtration, a second filtration, corresponding to a second time constant having a value greater than that of the first time constant, of the arbitrated braking signal, wherein the regenerative braking device is applied to brake the vehicle according to the braking instruction generated by the processing means via the time filtration of the arbitrated braking signal.

8. The device as claimed in claim 7, wherein the processing means is configured to detect whether the braking instruction reaches a first value and, following the detection, to enforce switching from the first to the second filtration.

9. The device as claimed in claim 8, wherein the first value is equal or substantially equal to a torque value equivalent to the engine braking that would be obtained with a combustion vehicle.

10. A vehicle, comprising:
   at least one regenerative braking device; and
   the adaptation device as claimed in claim 7.

11. A device for adapting an engine-braking simulation for a vehicle provided with a regenerative braking device, said device comprising:
   a receiving device to receive a simulated engine-braking signal value output from a simulation module and developed on the basis of signals output from an acceleration pedal, and for receiving at least one signal output from at least one active safety system,
   at least one processor to generate an arbitrated braking signal on the basis of the simulated engine-braking signal and the signal output from the active safety system received by the receiving device,
   wherein the processor generates the braking instruction intended for the regenerative braking device by time filtration of the arbitrated braking signal, the time filtration by the processor including:
      a first filtration, corresponding to a first time constant, of the arbitrated braking signal; and
      after the first filtration, a second filtration, corresponding to a second time constant having a value greater than that of the first time constant, of the arbitrated braking signal, and
   wherein the regenerative braking device is applied to brake the vehicle according to the braking instruction generated by the processor via the time filtration of the arbitrated braking signal.

12. The device as claimed in claim 11, wherein the processor is configured to detect whether the braking instruction reaches a first value and, following the detection, to enforce switching from the first to the second filtration.

13. The device as claimed in claim 12, wherein the first value is equal or substantially equal to a torque value equivalent to the engine braking that would be obtained with a combustion vehicle.

* * * * *